DELAY LINE REACTANCE DEVICE
Filed April 20, 1965
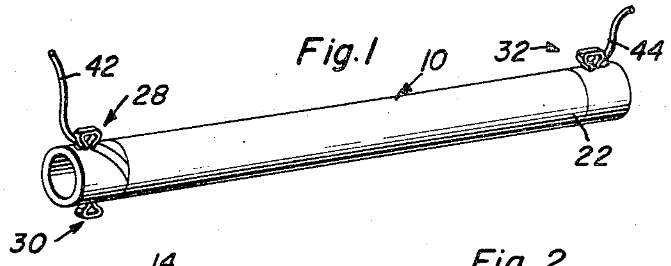
Fig. 1
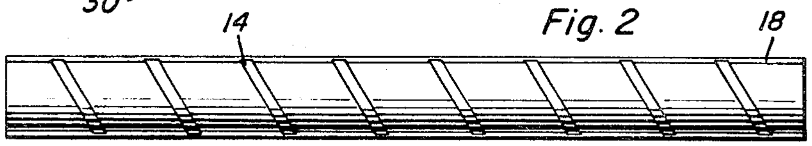
Fig. 2
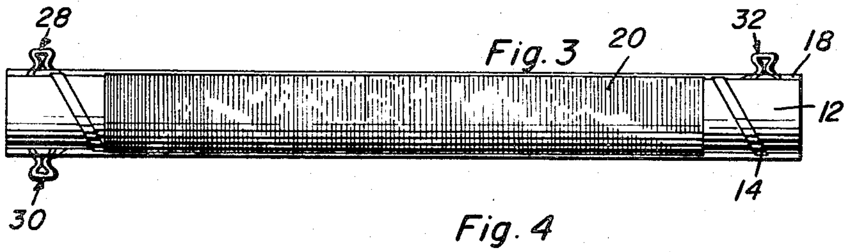
Fig. 3
Fig. 4
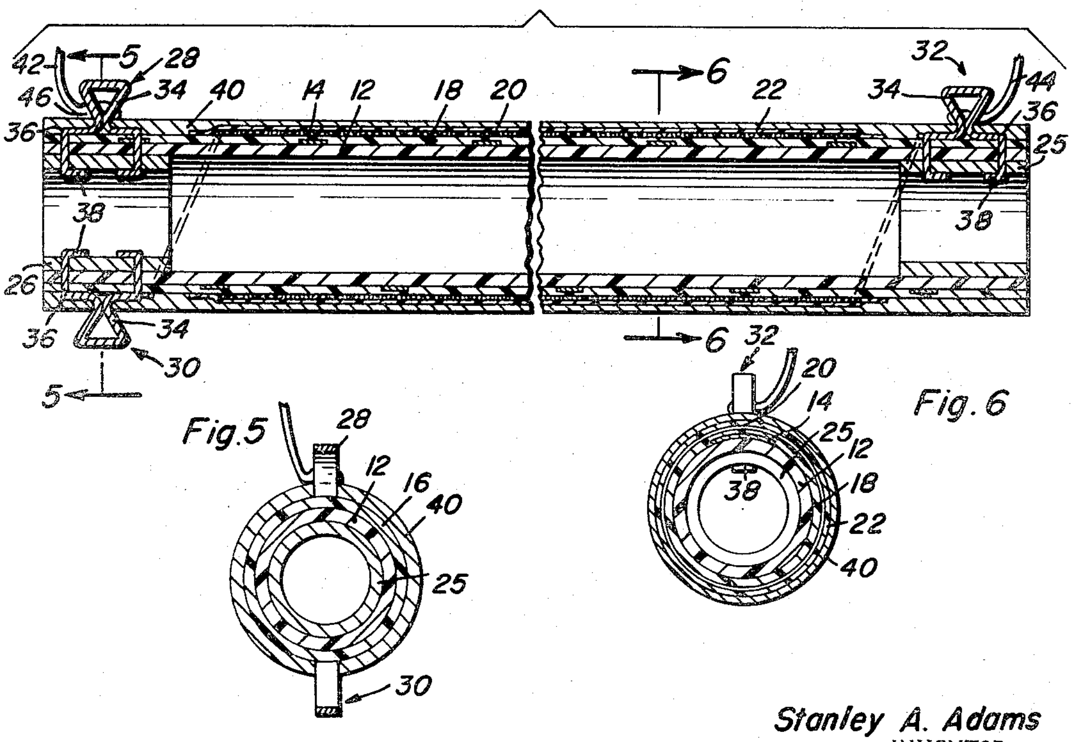
Fig. 4, Fig. 5, Fig. 6
Fig. 7
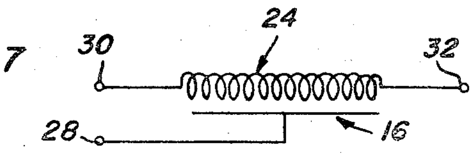
Stanley A. Adams
INVENTOR.
BY Clarence A. O'Brien
and Harvey B. Jacobson
Attorneys United States Patent Office 3,418,606

Patented Dec. 24, 1968

3,418,606
DELAY LINE REACTANCE DEVICE

Stanley A. Adams, South Haven, Mich., assignor to Adams Electronics, Inc., a corporation of Michigan Filed Apr. 20, 1965, Ser. No. 449,559
10 Claims. (Cl. 333—31)

ABSTRACT OF THE DISCLOSURE

A non-conductive tubular coil form has a continuous copper foil ribbon wound thereon covered by a dielectric layer over which a fine wire is tightly wound. Terminals anchored to end portions of the coil form are electrically connected to the copper foil and wire winding which form capacitive plates and present inductive reactance to electrical signals transmitted therethrough.

This invention relates to time delay lines for use in electrical circuits.

An electrical delay line is often in the configuration of a circuit having input and output terminals arranged so that a significant period of time, so-called delay time, is required for signals to pass through the circuit from the input to the output terminals. Such delay lines are commonly used in communications, computing, measuring and other circuits.

Such delay lines embody, within the structure of relatively short lengths, electrical characteristics equivalent to hose in transmission lines of much greater length, for example several miles, by interconnecting inductance and capacitance elements for response to given signals in the same manner as a natural transmission line.

The elements constitute an "impedance" or "reactance," i.e. that part of impedance due to inductance and capacitance, to the signals. These elements are conventionally either "lumped" or "distributed" in character. In the former, each structural element is primarily an inductance or a capacitance element. In the latter, a given structure, for example an inductance winding, may be operative as both an inductance element as well as forming in part, a capacitance element.

Accordingly, it is an object of the present invention to provide a novel unitary structural organization for components of a distributed type delay line which is of small size and weight, compact and extremely mechanically sturdy.

It is a further object of the present invention to provide a distributed type delay line wherein the winding constitutes one plate of the capacitive elements.

It is a still further object of the present invention to provide a delay line of the distributed type which eliminates the need of separate space consuming elements, such as capacitors and supports therefor.

It is another object of the present invention to provide a delay line device having substantially constant reactance characteristics.

It is a still further object of the present invention to provide a delay line device which is substantially moisture resistant.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the delay line device comprising the present invention;

FIGURE 2 is a side elevational view of the delay line device in a first stage of construction;

FIGURE 3 is a side elevational view of the delay line device in a second stage of construction;

FIGURE 4 is an enlarged horizontal cross-sectional view of a completed delay line device comprising the present invention;

FIGURE 5 is a cross-sectional view taken substantially along the plane of the line 5—5 of FIGURE 4;

FIGURE 6 is a cross-sectional view taken substantially along the plane of the line 6—6 of FIGURE 4;

FIGURE 7 is an equivalent circuit representation of the capacitive and inductive elements of the delay line comprising the present invention.

Referring now more particularly to the drawings, reference numeral 10 refers generally to the delay line device comprising the present invention. As shown in FIGURES 4 through 6, the delay line device 10 is in the form of a generally hollow multi-layered elongated tubular device. An inner layer 12 constitutes a coil form, which in this case is preferably made of spiral wound Mylar, a generally water resistant polyethylene film or a similar low moisture absorbing material, which may be made of any diameter required. As may be seen best in FIGURES 2 and 4, a copper foil ribbon 14 of uniform width and constant thickness is helically wrapped about the coil form 12. It may be appreciated that the copper foil ribbon 14 may be of any width or thickness depending upon the operating parameters desired. The copper foil ribbon is wound in a helical manner so that the ribbon area is constant over a given length of the coil form. This ribbon being continuous as shown constitutes one plate of the capacitive element 16 diagrammatically shown in the equivalent circuit diagram of FIGURE 7.

Wrapped about the copper foil ribbon 14 and extending substantially over the entire length of the coil form 12 is a sleeve 18 of dielectric material, such as a Mylar ribbon or the like, such dielectric material being well known to those skilled in the art. Wrapped about the dielectric sleeve is a more tightly wound inductance coil winding 20 spaced from the copper foil 14 by the dielectric sleeve 18 which therefore has a substantially smaller coil pitch than the copper foil. This winding is preferably of any well known fine electrically conductive wire. The winding covers a major portion of the coil form 12, its length being a factor determinative of the ultimate reactance parameters of the delay line device. It is apparent therefore that the length of the winding over the coil form must be carefully controlled and held constant as explained below. The winding 20 is held on the coil form by a tape covering 22. This winding 20 constitutes a well known inductance coil 24 and furthermore constitutes the second plate of the capacitive element 16. It will be readily apparent to those skilled in the art that an inherent capacitance exists between the winding 20 and the copper foil 14, which are capacitively coupled along their length to provide a distributed type capacitor. Thus, the turns of the copper foil 14 are axially spaced a substantial distance apart as best seen in FIGURE 2 in order to avoid any substantial inductive coupling to the induction coil 20. The tape 22 is preferably a cellulose acetate tape with an adhesive back which when wound on the winding 20 adhesively adheres thereto forming a sleeve about the winding.

Placed internally at the ends of the coil form 12 are terminal support collars 25 and 26. As may be seen from FIGURE 4, these collars are of relatively short length, and of tubular construction. These collars 25 and 26 are preferably of heavy paper construction and are impregnated with a phenolic resin material or the like in order to be lightweight and water and heat resistant.

There are terminals 28, 30 and 32 fastened to the coil form adjacent the ends thereof. The terminals are preferably made of a metallic conductive material, well known to those skilled in the art. The terminals have upper portions 34 of generally triangular shape which extend outwardly of the coil form 12. Integrally formed with upper portions 34 are lower portions 36 of generally rectangular shape. The upper portions 34 rest against the dielectric sleeve 18 and the lower portions 36 extend through the sleeve 18, the coil form 12 and the collars 25 and 26. The lower portions 36 include tab portions 38 which are bent to abut the inner peripheral surface of the collars 25 and 26 and serve to hold the terminals in place on the coil form. Furthermore, the tab portions 38 serve to hold the collars 25 and 26 within the coil form 12.

After the delay line device 10 has been assembled as described above, the completed unit is then flash dipped in a paraffin like wax substance 40 or the like, to seal the winding 20 and the copper foil 14 from moisture. It is noted that a paraffin which has a melting point above the normal operating temperature of the device is used.

Although the theory for "distributed-constant" delay lines is conventional and well known to those skilled in the art, the application of such theory to this device is explained as follows: The delay in transit time for transmitting signals by the delay line device varies with the inductance and capacitance of the device, the delay time formula being $T=\sqrt{LC}$, where T is time, L is inductance, and C is capacitance. As may be seen by this formula any change in either capacitance or inductance can change the delay time. The capacitance (C) may be derived by the following formula, $C=0.2244\ AK/D$ wherein A equals the area of the copper foil 14 covered by the winding 20; K equals the dielectric constant of the material; and D equals the thickness of the dielectric material. The inductance may be derived by the formula $MTN^2$, wherein MT equals the mean turn length of the coil and N equals the number of turns of the coil. Thus, it may be seen that in order to provide constant operating parameters for the delay line device 10, the thickness of the dielectric material 18 and the length of the winding 20 must be held constant. A further element which must be held constant is the width and number of turns per inch of the copper foil 14, as this effects the area of the electrode, copper foil 14 covered by the winding 20.

Electrical leads 42 and 44 are connected to the terminals 28 and 32 respectively in a conventional manner as by solder 46. The terminals 28, 30 and 32 as well as leads 42 and 44 are provided for use of the delay line device in an electrical circuit in a well known manner. As may be seen from FIGURE 4, the coil 20 is connected to terminals 30 and 32, and the terminal 28 is connected to the copper foil ribbon 14, thus providing operative electrical connections for the device.

It may be seen from the foregoing description the structure of the delay line device as well as its theory of operation, that the invention herein provides an improved quality delay line by limiting its susceptibility to water absorption through the use of water resistant material and sealing of the component parts throughout the construction thereof. Further, the present invention provides a delay line with extremely consistent operating parameters by strictly controlling the construction of the device. The importance of this type of construction is the definite consistency that occurs in the delay line function because the placement of the copper foil on the coil form is carefully controlled as well as the width and manner of placement of the dielectric.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical delay line comprising an elongate rigid coil form, a continuous copper foil ribbon helically wound on said form, said form having collar means mounted at opposite ends thereof, dielectric material disposed on said form in surrounding relationship to said ribbon, a helical inductance wire coil wound about said material more tightly than the foil ribbon, means for holding said winding on said form, a plurality of terminals, means for holding said terminals on said form, a first of said terminals being connected to said ribbon, and second and third of said terminals being connected to said winding whereby said winding and said ribbon are supported in capacitively coupled relationship.

2. An electrical delay line comprising an elongate rigid coil form, a copper foil ribbon mounted on said form, said form having collar means disposed within the opposite ends thereof, dielectric material disposed on said form in surrounding relationship to said ribbon, a helical inductance wire coil wound about said material substantially the entire length of the form, means for holding said winding on said form, a plurality of terminals, means for holding said terminals on said form, a first of said terminals being connected to said ribbon, and second and third of said terminals being connected to said winding whereby said winding and said ribbon are supported in capacitively coupled relationship, said copper foil ribbon being helically wound about said coil form and said dielectric material being a sleeve having a constant thickness throughout its length, said winding being relatively fine conductive wire and said winding holding means comprising a sleeve means adhesively wrapped about said winding and covering all of said winding except single strands thereof leading to said second and third terminals.

3. The apparatus of claim 2 wherein said collars are heavy paper impregnated with a phenolic resin composition and said sleeve means is covered with wax thereby effectively sealing said winding and copper ribbon from moisture.

4. The apparatus of claim 1 wherein said terminal holding means comprises tabs extending from said terminals through said coil form and said collars, said tabs being bent to abut the internal surface of said collars thereby fixing said terminals and said collars in place on said coil form.

5. A constant distributive-delay-line device comprising an elongate hollow coil form of polyester material, a copper foil ribbon of constant thickness helically wound about the entire length of said coil form to constitute a first capacitor plate, a ribbon of dielectric material disposed on said form in surrounding relationship to said copper foil ribbon, said dielectric ribbon being of constant thickness throughout its length, an inductive winding on said form in surrounding relationship to said dielectric ribbon and extending substantially the entire length of said coil form, said winding constituting a second capacitor plate, a plurality of terminals mounted on said form, said copper foil ribbon in contact with a first of said terminals, and said winding in contact with second and third of said terminals whereby said device constitutes a constant reactance delay line.

6. The apparatus of claim 5 further including phenolic resin impregnated paper collars fixed at the ends of said forms and said form being covered with an outer sheet of water impregnable material thereby effectively sealing said ribbon and said winding from moisture.

7. An electrical reactance device comprising, an elongated tubular member made of a non-conductive material, a continuous flat strip of conductive material helically wound about said tubular member between opposite ends thereof at a relative wide pitch, inductive coil means helically wound on said tubular member at a relatively close pitch in radially spaced relation to the strip of conductive material, dielectric spacing means disposed between the strip of conductive material and the inductive coil means and terminal means mounted adjacent opposite ends of the tubular member and electrically connected to the inductive coil means and the strip of conductive material.

8. An electrical reactance device comprising, an elongated tubular member made of a non-conductive material, a flat strip of conductive material helically wound about said tubular member between opposite ends thereof, inductive coil means mounted on said tubular member in radially spaced relation to the strip of conductive material, dielectric spacing means disposed between the strip of conductive material and the inductive coil means and terminal means mounted adjacent opposite ends of the tubular member and electrically connected to the inductive coil means and the strip of conductive material, said terminal means comprising, a pair of non-conductive elements mounted internally of the tubular member at said opposite ends thereof, a pair of terminal elements anchoring one of the non-conductive elements to the tubular member at one end thereof, a third terminal element anchoring the other non-conductive element to the tubular member at the other end thereof, said strip of conductive material being electrically connected to one of said pair of terminal elements at said one end of the tubular member, said inductive coil means being electrically connected to the other terminal elements at the opposite ends of the tubular member.

9. A delay line reactance device comprising a rigid tubular member having opposite axial end portions and being made of a nonconductive material, a continuous foil strip of conductive material helically wound about said tubular member an inductive coil wound about the tubular member with a smaller pitch than the continuous foil strip, an insulative coating dielectrically separating the flat foil strip and the inductive coil in capacitive coupling relation to each other, a first terminal mounted adjacent one of said axial end portions connected to one axial end of said flat foil strip, and second and third terminals respectively mounted at the opposite axial end portions between which the inductive coil is connected.

10. The combination of claim 9 including non-conductive support means mounted internally of the tubular member through which said terminals extend.

References Cited

UNITED STATES PATENTS

| | | | |
|---|---|---|---|
| 3,283,269 | 11/1966 | Bernstein | 333—29 |
| 3,173,111 | 3/1965 | Kallman | 333—31 |
| 2,467,061 | 2/1949 | Kallman | 336—31 |
| 2,943,276 | 6/1960 | Lovich | 333—29 |
| 2,457,212 | 12/1948 | Di Toro | 333—31 |
| 3,034,062 | 5/1962 | Bleam | 328—56 |

HERMAN KARL SAALBACH, *Primary Examiner.*

C. BARAFF, *Assistant Examiner.*

U.S. Cl. X.R.

333—29